BEST AVAILABLE COPY

UNITED STATES PATENT OFFICE.

HARRY A. WILLS, OF VERGENNES, VERMONT, ASSIGNOR TO JULIA A. WILLS AND LUCY S. KINGSLAND.

IMPROVEMENT IN THE ART OF FINISHING HORSESHOE-NAILS.

Specification forming part of Letters Patent No. 122,876, dated January 16, 1872; reissue No. 5,249, dated January 21, 1873; reissue No. 6,713, dated October 19, 1875; application filed August 11, 1874.

DIVISION B.

*To all whom it may concern:*

Be it known that I, HARRY A. WILLS, of Vergennes, in the county of Addison and State of Vermont, have invented a new and Improved Process of Cold-Rolling Horseshoe-Nails, of which the following is a specification:

This invention relates to a process of cold-rolling horseshoe-nails, whereby the nail is made hard upon only one side, or harder upon one side than the other, so that it is stiffened sufficiently to stand the driving, and still remains tough enough, when bent away from the soft side, to form a clinch without breaking.

After the nails have been formed in any of the well-known ways I finish them by cold-rolling as follows: I subject the nail to a cold pressure, between a surface or bed-plate and a roller, so that the nail is rolled only on one side. The side which comes in contact with the roller is compacted and hardened, while the other side, which rests upon the bed-plate or surface, remains softer. The point of the nail is beveled upon the soft side, so that in driving it will incline to bend away from the soft side, and may be clinched by bending it down away from said soft side, the metal yielding in this direction without danger of breaking.

A suitable mechanism for performing this process is described in Division A of this reissue, and need not be here again set forth.

Having thus described my invention, I claim as new and desire to secure by Letters Patent—

The improvement in the art of finishing horseshoe-nails, which consists in rolling one surface of the nail while cold, the opposite surface being supported its entire length upon an anvil.

HARRY A. WILLS.

Witnesses:
HEINRICH F. BRUNS,
LEWIS L. COBURN.